(12) United States Patent
Stathakis et al.

(10) Patent No.: US 12,375,946 B2
(45) Date of Patent: Jul. 29, 2025

(54) CONFIGURATION OF A COMMUNICATIONS NETWORK

(71) Applicant: Telefonaktiebolaget LM Ericsson (publ), Stockholm (SE)

(72) Inventors: Efthymios Stathakis, Stockholm (SE); Arthur Gusmao, Rüschlikon (CH); Yu Wang, Solna (SE); Swarup Kumar Mohalik, Bangalore Karnataka (IN); Martha Vlachou-Konchylaki, Stockholm (SE); Joerg Niemoeller, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 537 days.

(21) Appl. No.: 17/769,635

(22) PCT Filed: Oct. 18, 2019

(86) PCT No.: PCT/EP2019/078454
§ 371 (c)(1),
(2) Date: Apr. 15, 2022

(87) PCT Pub. No.: WO2021/073760
PCT Pub. Date: Apr. 22, 2021

(65) Prior Publication Data
US 2023/0146802 A1    May 11, 2023

(51) Int. Cl.
*H04W 24/02* (2009.01)
*H04L 41/16* (2022.01)
*H04W 24/10* (2009.01)

(52) U.S. Cl.
CPC ............. *H04W 24/02* (2013.01); *H04L 41/16* (2013.01); *H04W 24/10* (2013.01)

(58) Field of Classification Search
CPC ..... H04W 24/02; H04W 24/10; H04W 24/04; H04L 41/16
See application file for complete search history.

(56) References Cited

U.S. PATENT DOCUMENTS 10,327,159 B2  6/2019  Tan et al.
10,375,585 B2  8/2019  Tan et al.
(Continued)

FOREIGN PATENT DOCUMENTS

WO   WO 2017116853 A1   7/2017

OTHER PUBLICATIONS

International Search Report and Written Opinion of the International Searching Authority, PCT/EP2019/078454, mailed Apr. 21, 2020, 12 pages.

*Primary Examiner* — Mazda Sabouri
(74) *Attorney, Agent, or Firm* — Sage Patent Group (57) ABSTRACT

A method of configuration in a communications network includes: obtaining operational data relating to operation of at least one network node, the operational data including, for each of a plurality of time periods, data relating to at least one configuration parameter of the network node and data relating to at least one performance indicator of the network node; defining a plurality of actions, wherein each action corresponds to a specific set of values of the at least one configuration parameter in two successive time periods; and defining a plurality of states, wherein each state corresponds to one specific set of values of the operational data. A probabilistic graph is constructed from the operational data, the probabilistic graph indicating, for a plurality of the defined states, a probability that an action will lead to a transition to a respective other state.

16 Claims, 6 Drawing Sheets

(56) References Cited

U.S. PATENT DOCUMENTS

| | | | |
|---|---|---|---|
| 10,637,753 B1* | 4/2020 | Taft | H04L 43/04 |
| 2016/0165472 A1 | 6/2016 | Gopalakrishnan et al. | |
| 2018/0019910 A1 | 1/2018 | Tsagkaris et al. | |
| 2018/0219754 A1 | 8/2018 | Udupi et al. | |
| 2019/0014487 A1 | 1/2019 | Yang et al. | |
| 2020/0382361 A1* | 12/2020 | Chandrasekhar | G06N 3/044 |

* cited by examiner

CONFIGURATION OF A COMMUNICATIONS NETWORK

CROSS REFERENCE TO RELATED APPLICATIONS

This application is a 35 U.S.C. § 371 national stage application of PCT International Application No. PCT/EP2019/078454 filed on Oct. 18, 2019, the disclosure and content of which is incorporated by reference herein in its entirety.

TECHNICAL FIELD

This relates to the configuration of a communications network, and in particular to the configuration of a node in such a network.

BACKGROUND

The configuration of relevant parameters in a communications network has an effect on the service that is delivered to users of the network. As one example, the description herein relates primarily to a cellular communications network, and to the configuration of parameters in cells of the network, but it will be appreciated that the same methods can be applied to the configuration of parameters in any node of any network.

In the example of a cellular network, the quality-of-service that is delivered to the end user equipment devices, UEs, is critical for the users' perceived experience, especially when it comes to mobile broadband (also referred to as MBB), for example for video streaming, file downloading or web browsing, and Voice-over LTE (VoLTE) calls.

There are numerous ways to describe performance from a network perspective, for example by registering individual incidents. In the case of VoLTE, such incidents would be the number of dropped calls or the setup delay, whereas for HTTP-based adaptive streaming (HAS) services, such incidents would be the number of stalling events or the playback quality degradation.

Recording this information serves a dual purpose, namely to monitor segments of the network on a given time-scale, for example on an hourly and/or a daily basis, and to allow beneficial actions to be taken, that is, to reconfigure the network parameters in order to improve certain Key Performance Indicators (KPIs).

Typically, technicians perform several actions in a network on a daily basis, though they are not usually aiming to improve any particular service KPI, but instead are targeting general network performance metrics, such as the coverage or the inter-cell interference. Some actions may have a particular impact on certain KPIs, while others may be less influential, yet this is usually not known in advance.

One problem that arises in the operation of such a network is to identify relevant features and configuration changes, since thousands of such network changes take place daily, in some designated geographical area. The deployment of 5th Generation (5G) cellular networks, with further cell densification, will render this identification task even more challenging as the network size will grow even further beyond the level that is manageable manually.

Standard machine learning (ML) techniques could potentially be used to create models for the KPIs of interest, and these models could then be used to understand the critical features, and to test different combinations of input feature values to determine which yield improvement. However, this would require multiple ML models, whose interactions would not be easy to infer, and determining the suitable combinations of feature values is challenging for high-dimensional problems with many relevant features.

SUMMARY

According to an aspect of the invention, there is provided a method of configuration in a communications network. The method comprises obtaining operational data relating to operation of at least one network node, the operational data comprising, for each of a plurality of time periods, data relating to at least one configuration parameter of the network node and data relating to at least one performance indicator of the network node. The method further comprises defining a plurality of actions, wherein each action corresponds to a specific set of values of the at least one configuration parameter in two successive time periods. The method further comprises defining a plurality of states, wherein each state corresponds to one specific set of values of the operational data. The method further comprises constructing a probabilistic graph from said operational data, the probabilistic graph indicating, for a plurality of the defined states, a probability that an action will lead to a transition to a respective other state.

The operational data may relate to operation of a cell of a cellular communications network, such that the data relating to at least one configuration parameter comprise data relating to at least one configuration parameter of the cell, and the data relating to at least one performance indicator comprise data relating to at least one performance indicator of the cell. The at least one performance indicator may then comprise one performance indicator selected from: a drop rate of voice calls; a latency of a streaming media connection; and a jitter of a streaming media connection.

The operational data may relate to operation of a core network node of a cellular communications network, such that the data relating to at least one configuration parameter comprise data relating to at least one configuration parameter of the core network node, and the data relating to at least one performance indicator comprise data relating to at least one performance indicator of the core network node. The at least one performance indicator may then comprise one performance indicator selected from: a service request success rate; and a handover success rate.

The probability that an action will lead to a transition to a respective other state may comprises a ratio of a number of times that performing said action in a first state has led to a transition to said other state to a total number of times that said action has been performed in said first state.

The method may further comprise: identifying a current state and at least one desired state; and determining at least one action to cause the transition from the current state to a desired state. More specifically, the method may comprise: determining said at least one action to cause a shortest path transition from the current state to the desired state, or may comprise: determining said at least one action to cause a maximum probability transition from the current state to the desired state.

The method may further comprise applying any change in a configuration parameter corresponding to the at least one determined action.

The data relating to the at least one performance indicator of the cell may be obtained by data binning of values of the at least one performance indicator. There may be a plurality of performance indicators, in which case the data relating to said performance indicators may be obtained by joint data binning of the values of the performance indicators.

The method may further comprise updating the probabilistic graph based on new operational data.

According to another aspect of the invention, there is provided a method of configuration in a communications network. The method comprises receiving information defining a probabilistic graph, wherein the probabilistic graph indicates, for a plurality of defined states, a probability that an action will lead to a transition to a respective other state, wherein each defined state corresponds to one specific set of values of operational data, wherein the operational data relate to operation of at least one network node, and comprise, for each of a plurality of time periods, data relating to at least one configuration parameter of the network node and data relating to at least one performance indicator of the network node, and wherein each of a plurality of defined actions corresponds to a specific set of values of the at least one configuration parameter in two successive time periods. The method further comprises identifying a current state and at least one desired state. The method further comprises determining at least one action to cause the transition from the current state to a desired state.

The method may further comprise causing any change in a configuration parameter corresponding to the at least one determined action to be applied in a network node.

The operational data may relate to operation of a cell of a cellular communications network, such that the data relating to at least one configuration parameter comprise data relating to at least one configuration parameter of the cell, and the data relating to at least one performance indicator comprise data relating to at least one performance indicator of the cell.

According to another aspect of the present invention, there is provided a node for configuration of a communications network. The node comprises processing circuitry and a memory containing instructions executable by the processing circuitry. The node is operable to obtain operational data relating to operation of at least one network node. The operational data comprises, for each of a plurality of time periods, data relating to at least one configuration parameter of the network node and data relating to at least one performance indicator of the network node. The node is operable to define a plurality of actions, wherein each action corresponds to a specific set of values of the at least one configuration parameter in two successive time periods. The node is operable to define a plurality of states, wherein each state corresponds to one specific set of values of the operational data. The node is further operable to construct a probabilistic graph from said operational data, the probabilistic graph indicating, for a plurality of the defined states, a probability that an action will lead to a transition to a respective other state.

According to another aspect of the present invention, there is provided a node for configuration of a communications network, the node comprising processing circuitry and a memory containing instructions executable by the processing circuitry. The node is operable to receive information defining a probabilistic graph, wherein the probabilistic graph indicates, for a plurality of defined states, a probability that an action will lead to a transition to a respective other state. Each defined state corresponds to one specific set of values of operational data, wherein the operational data relate to operation of at least one network node, and comprise, for each of a plurality of time periods, data relating to at least one configuration parameter of the network node and data relating to at least one performance indicator of the network node. Each of a plurality of defined actions corresponds to a specific set of values of the at least one configuration parameter in two successive time periods. The node is operable to identify a current state and at least one desired state and determine at least one action to cause the transition from the current state to a desired state.

According to another aspect of the invention, there is provided a configuration system, comprising a processor and a memory, wherein the processor is configured to perform a method according to any aspect of the invention.

According to another aspect of the invention, there is provided a computer program product, comprising software configured to cause a suitably programmed processor to perform a method according to any aspect of the invention.

Thus, advantageously, the construction of a probabilistic graph is an efficient representation of the historical data records, which allows the inference of influential features and configuration changes based on the graph, and hence the proposal of changes towards the improvement of certain KPIs, and the actuation of the proposals.

BRIEF DESCRIPTION OF THE DRAWINGS

For a better understanding of the present invention, and to show how it may be put into effect, reference will now be made, by way of example only, to the following figures, in which:—

DETAILED DESCRIPTION

Figure 1:
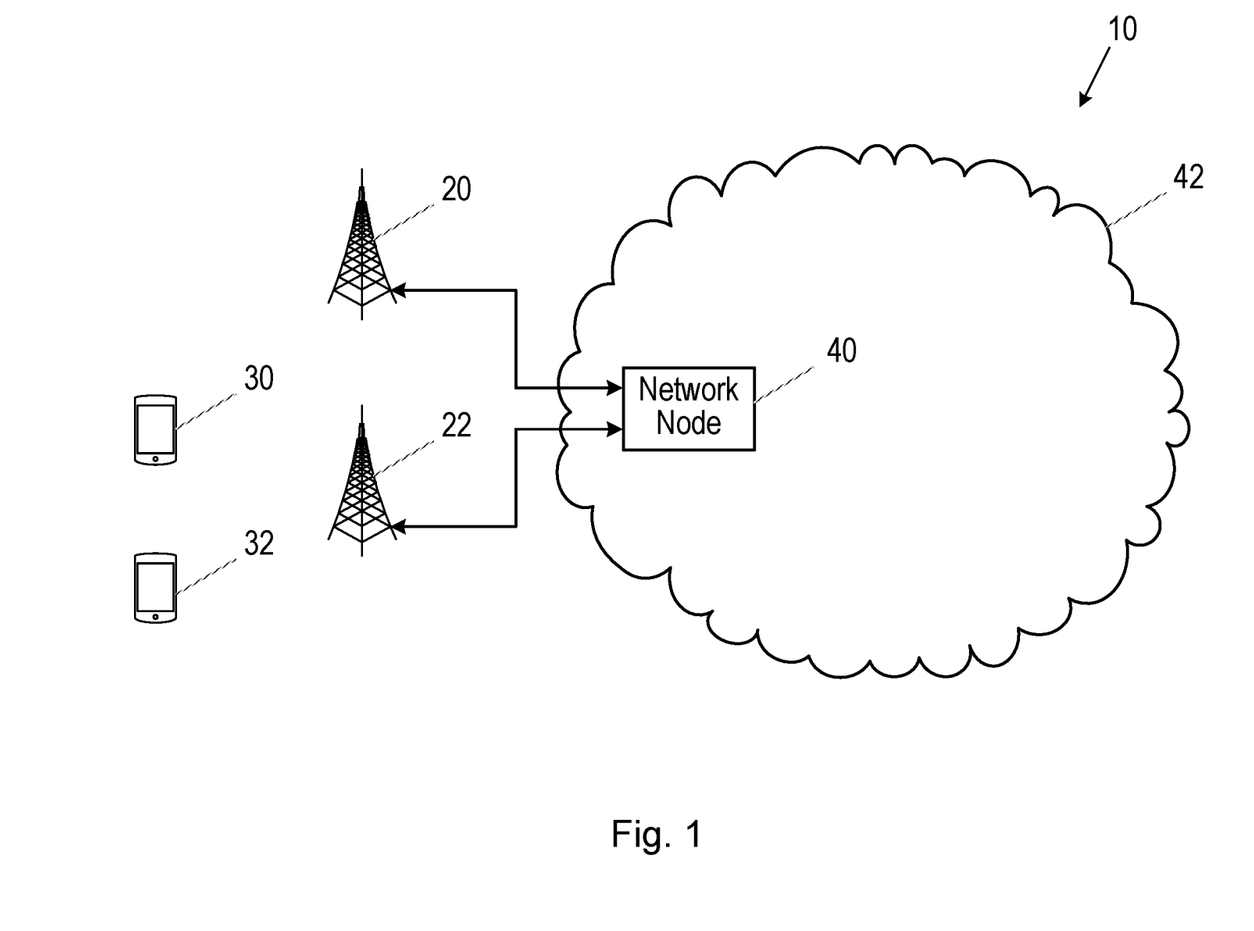
FIG. 1 is a schematic representation of a part of a communications network.

FIG. 1 illustrates a part of a communications network 10, comprising multiple base stations 20, 22. The base stations 20, 22 provide service to UEs 30, 32 in their vicinity, and are connected to a network node 40 in a core network 42 of the communications network.

It will be appreciated that FIG. 1 shows just a small part of the communications network, but this is sufficient for an understanding of the present invention.

Figure 2:
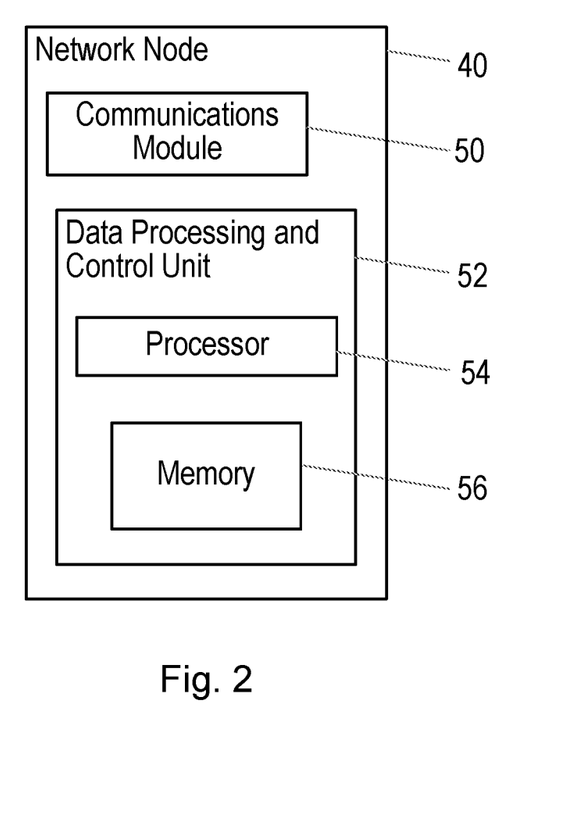
FIG. 2 illustrates the form of a network node in the communications network of FIG. 1.

FIG. 2 shows a part of the network node 40. Specifically, FIG. 2 shows the network node 40 having a communications module 50 and a data processing and control unit 52.

The communications module 50 is configured for communicating with other entities in the network, for example by transmitting and receiving signals in accordance with suitable communications standards. The data processing and control unit 52 includes a processor 54 and a memory 56. The processor 54, which may include one or more processing device, which may be co-located or may be in different locations, performs data processing and logical operations, and the memory 56, which may comprise one or more memory device, which may be co-located or may be in different locations, stores working data and program instructions for causing the processor 54 to perform the methods described herein. The program instructions configured to cause a suitably programmed processor to perform a method as described herein may be provided as a separate computer program product.

Figure 3:
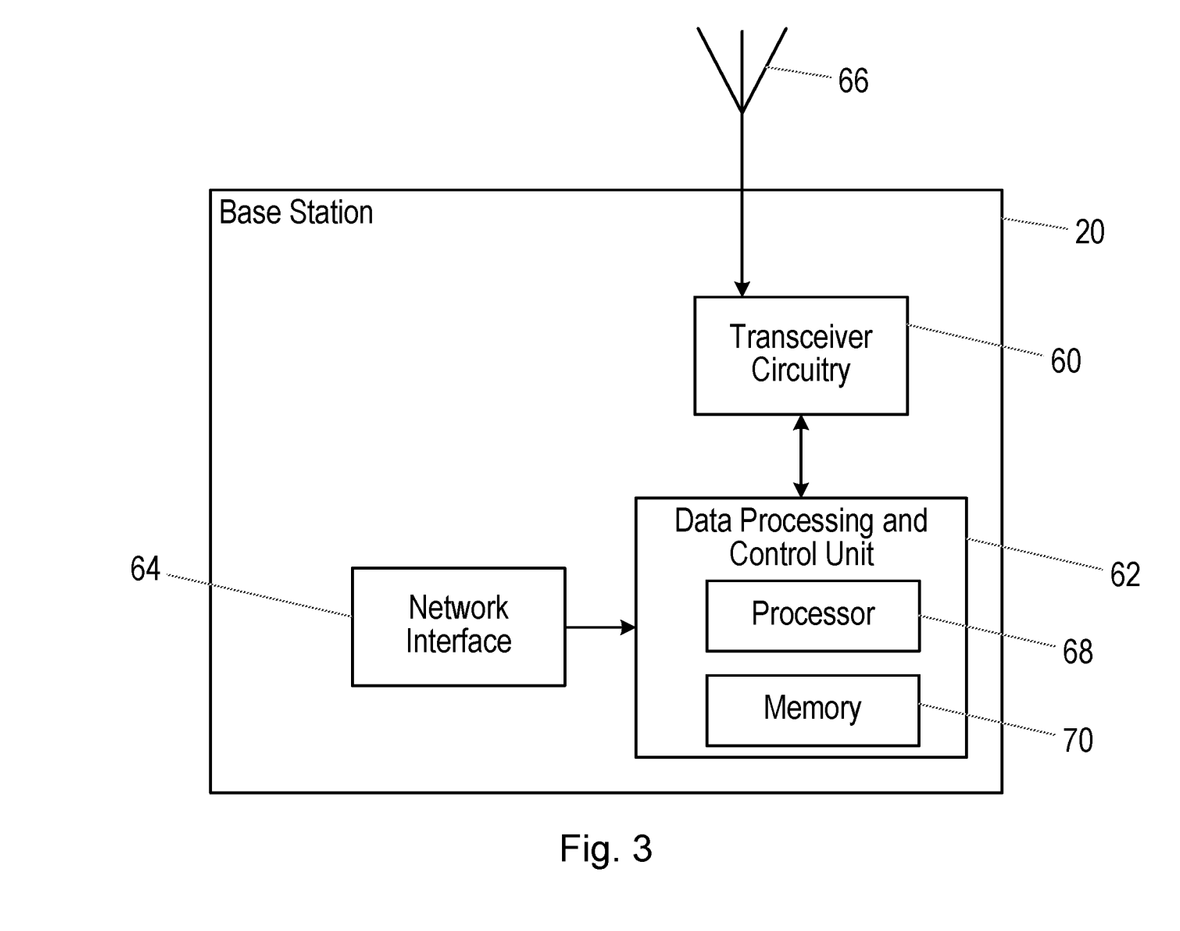
FIG. 3 illustrates the form of a base station in the communications network of FIG. 1.

FIG. 3 shows a part of a base station 20. Specifically, FIG. 3 shows the base station 20 having transceiver circuitry 60, a data processing and control unit 62, and a network interface 64.

The transceiver circuitry 60 is configured for communicating with wireless entities such as UEs in the network, for example by transmitting and receiving signals via the antenna 66 in accordance with a suitable communications standard. The data processing and control unit 62 includes a processor 68 and a memory 70. The processor 68, which may include one or more processing device, which may be co-located or may be in different locations, performs data processing and logical operations, and the memory 70, which may comprise one or more memory device, which may be co-located or may be in different locations, stores working data and program instructions for causing the processor 68 to perform the methods described herein. The program instructions configured to cause a suitably programmed processor to perform a method as described herein may be provided as a separate computer program product. The network interface 64 is configured for communicating with other network nodes, for example by transmitting and receiving signals over wired network connections in accordance with suitable communications standards.

It will be appreciated that the network may include multiple nodes, with the functionality of the method described herein being distributed between those different nodes, or the functionality may be performed in a single physical node.

Thus, FIGS. 2 and 3 each show examples of a configuration system, comprising a processor and a memory, wherein the processor is configured to perform a method as described in more detail below.

Figure 4:
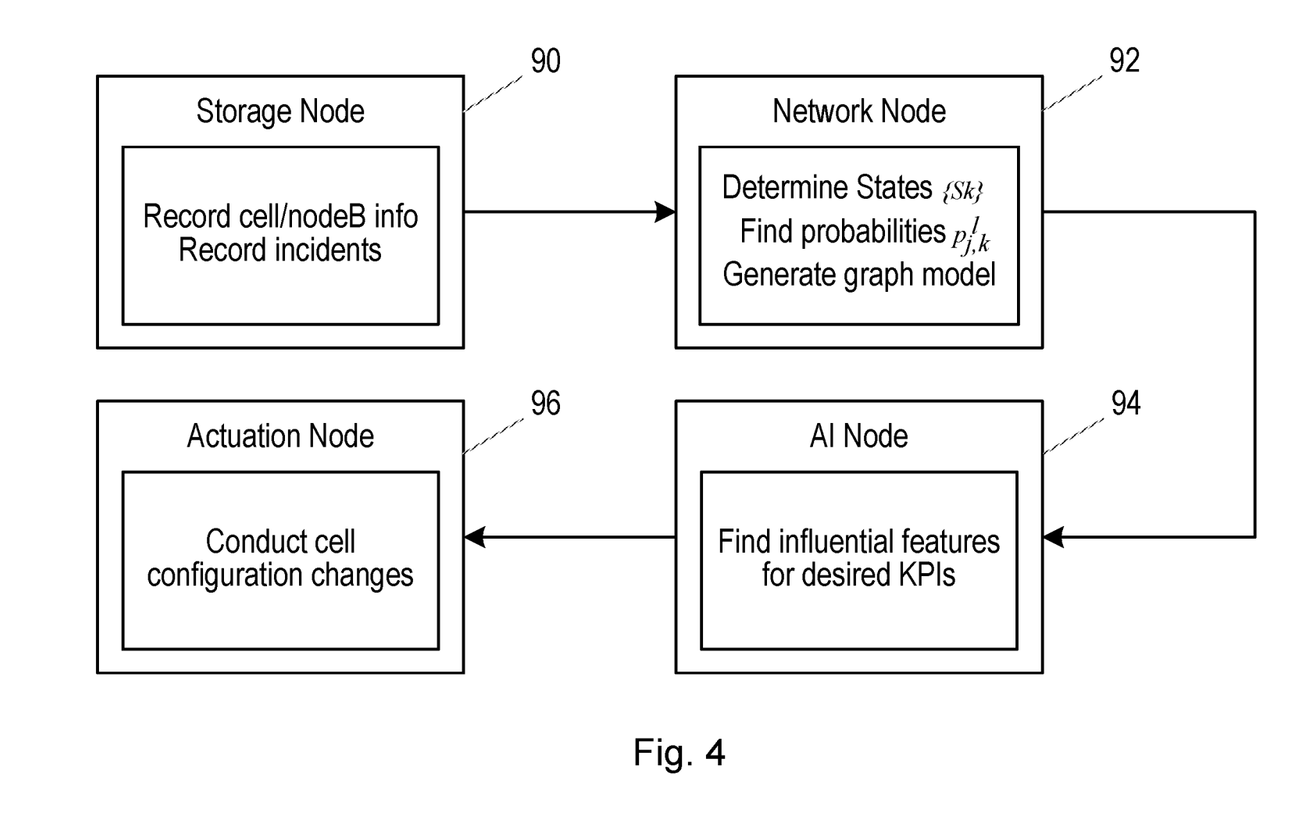
FIG. 4 is an overview of the configuration architecture of the communications network of FIG. 1.

FIG. 4 shows an example in which the different functions described herein are performed in different nodes, but as mentioned above these functions may be grouped as appropriate in any number of physical locations.

Specifically, FIG. 4 shows an example in which a storage node or element 90 records information about the state of a cell and/or a base station (or nodeB). As described in more detail below, this information relates to configuration features and KPIs of the cell and/or base station.

This information is used by a network node or element 92 to construct a probabilistic graph representation, as described in more detail below. For example, the network node 92 may be a network management node, which receives information from multiple storage nodes about multiple cells. In that case, the probabilistic graph that is constructed may use the information from the multiple cells. In other examples, a separate probabilistic graph may be constructed for each one cell or node.

An artificial intelligence (AI) node or element 94 uses the probabilistic graph in order to infer influential features and corresponding configuration changes that are relevant for the improvement of any target KPI.

Figure 5:
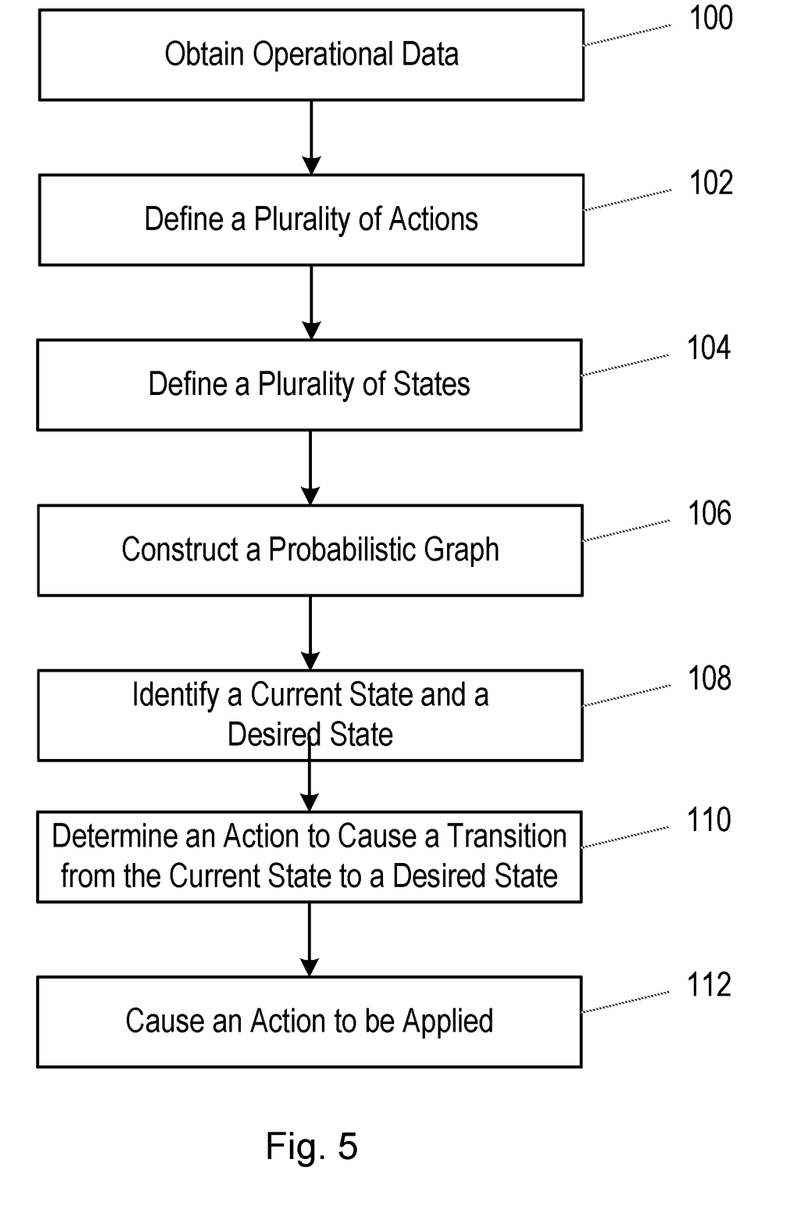
FIG. 5 is a flow chart illustrating a method according to the disclosure.

Based on the information from the AI node 94, an actuation node 96 uses the related network function to realize the proposed configuration changes. The actuation node 96 may therefore be in the cell where the configuration changes are to take place, FIG. 5 is a flow chart, illustrating a method in accordance with the disclosure.

As mentioned above, in one example the method is a method of cell configuration in a cellular communications network, but more generally the method is a method of configuration of any network node in a communications network.

The method starts at step 100, in which operational data are obtained. In the case of a method of cell configuration, the operational data relate to the operation of at least one cell, but more generally the operational data relate to the operation of the network node to be configured. The operational data comprise, for each of a plurality of time periods, data relating to at least one configuration parameter of the cell or node, and data relating to at least one performance indicator of the cell or node.

For example, depending on the required application, data relating to the at least one performance indicator may be recorded once per week, once per day, once per 6 hours, once per hour, once per 15 minutes etc.

In the case of the configuration of a cell in a cellular communications network, the configuration parameters may be such parameters as a power boost applied to Quadrature Amplitude Modulation (QAM) symbols, or a tilt of an antenna.

In the case of a cell in a cellular communications network, the data relating to the at least one performance indicator may for example be data relating to the Quality of Service (QoS) and/or Quality of Experience (QoE) characteristics of services such as Voice-over LTE (VoLTE) calls or streaming media services such as over-the-top (OTT) services. For example, in the case of VoLTE calls, a suitable performance indicator may be a call drop rate. In the case of streaming media services, suitable performance indicators may be the latency and/or the jitter experienced by a user. In the case of a node in a core network of the telecommunications network, suitable performance indicators include a service request success rate, or a handover success rate, and there may be separately calculated handover success rates for incoming and outgoing handovers, and for different radio access technologies, as described in ETSI TS 132 455 V10.0.0.

Where the at least one performance indicator can take any value within a range of values, it is convenient to place the values into data bins, so that the data relating to the at least one performance indicator must take one of a restricted number of values. Where more than one performance indicator is being considered, joint data binning may be performed, so that the data relating to the at least one performance indicator must take one of a restricted number of values, with each value corresponding to a first specific range of a first performance indicator and a second specific range of a second performance indicator.

In the architecture shown in FIG. 4, step 100 of the method may be performed in the storage node or element 90.

In step 102 of the method of FIG. 5, a plurality of actions are defined, wherein each action corresponds to a specific set of values of the at least one configuration parameter in two successive time periods. Thus, for example, an action may specify that a value of a specific configuration parameter is changed from v1 in a first time period to v2 in the next time period. Where there is more than one applicable configuration parameter, as will usually be the case, the action may specify values in the two consecutive time periods of more than one of the configuration parameters. An action, which may be referred to as a "null action", may also specify that the values of one or more configuration parameter in two consecutive time periods are unchanged.

In step 104 of the method of FIG. 5, a plurality of states are defined, wherein each state corresponds to one specific set of values of the operational data. That is, while the defined actions relate to the configuration parameters, the states relate to the configuration parameters and the performance indicators. In other words, the state can be said to define input features and target features, where the target features are the performance indicators, and the input features are the remaining elements comprising the state. The actions relate to the values of the input features.

The following table shows an example of the data records for a particular cell, having the cell identifier Id_1, where there are two cell configuration parameters, Feature 1 and Feature 2, and the targeted performance indicator is the VoLTE drop rate.

Values are obtained for Feature 1 and for Feature 2, and for the VoLTE drop rate, on each of 10 consecutive days, whose dates are indicated by the corresponding timestamp.

| Cell id | Timestamp | Feature 1 | Feature 2 | VoLTE drop | State | Action |
|---------|-----------|-----------|-----------|------------|-------|--------|
| Id_1 | 18/10/22 | 0 | 3 | 15.1 | 5 | — |
| Id_1 | 18/10/23 | 0 | 3 | 27.0 | 5 | A0_1 |
| Id_1 | 18/10/24 | 0 | 2 | 23.2 | 2 | A5 |
| Id_1 | 18/10/25 | 0 | 2 | 23.3 | 2 | A0_2 |
| Id_1 | 18/10/26 | 1 | 2 | 14.3 | 8 | A1 |
| Id_1 | 18/10/27 | 0 | 2 | 5.9 | 1 | A3 |
| Id_1 | 18/10/28 | 1 | 2 | 12.9 | 8 | A1 |
| Id_1 | 18/10/29 | 1 | 3 | 17.2 | 11 | A6 |
| Id_1 | 18/10/30 | 0 | 3 | 22.3 | 5 | A4 |
| Id_1 | 18/10/31 | 1 | 2 | 18.4 | 8 | A2 |

As mentioned above, the states that are defined can be considered as vectors that represent both the configuration parameters and the performance indicator(s) of interest.

In this example, since the performance indicator (the VoLTE drop rate) is a real number that can take infinitely many values, we create bins, and place each performance indicator value into a corresponding bin. For example, in this illustration we create three bins, $B_1$, $B_2$, and $B_3$, each covering a part of the range of possible values, so that the entire range is covered, such that $B_1=[0,10]$, $B_2=[10,50]$, $B_3=[50, \infty]$, and hence the KPI space could be defined as $\mathcal{B} = \{B_1 \cup B_2 \cup B_3\}$.

Other grouping methods are possible, where the clustering of the KPIs or any feature that may take several different values (or may take infinitely many different values in the case of real-valued features) is carried out. For example, expert-based binning may be carried out, where the performance indicator values are quantized based on expert's domain knowledge. Alternatively, algorithmic clustering may be used, for example using the DBSCAN density-based clustering algorithm, or using the k-means clustering algorithm to construct a given number of clusters.

Although this table shows only one performance indicator, the method can easily be extended to the situation where we are interested in modelling and improving several performance indicators simultaneously. The table is simply augmented with columns that correspond to the KPIs of interest.

As mentioned above, where there are multiple performance indicators being monitored, data binning may be performed either jointly or independently. The process of joint data binning might for example be performed by considering all of the performance indicator values to form a vector, calculating distance metrics between the vectors, and then using algorithmic clustering to identify the clusters.

In the table above, the configuration parameter Feature 1 can take the value 0 or 1, and the configuration parameter Feature 2 can take the value 2 or 3. The states are then the cartesian product of the input feature space $\mathcal{F}_1=\{0,1\}$, $\mathcal{F}_2=\{2,3\}$ and $\mathcal{B}$. Therefore, each state $S_k \in S$, where $S$ is the space of all possible states, would correspond to a tuple in the product space $\mathcal{F}_1 \times \mathcal{F}_2 \times \mathcal{B}$. In our example, each input feature takes one of two possible values and the KPI has been clustered into 3 groups, hence the cardinality of S is 12(=2×2×3) and we have 12 possible states in our system.

The table above shows the state corresponding to the configuration parameters and the performance indicator during each of the time periods under consideration.

In addition, the table above shows the actions that correspond to the input features of the states in pairs of consecutive time intervals, namely days in this example. Thus, in each row of the table after the first, the values of the configuration parameters in that time interval and the preceding time interval define the action indicated in that row. A change in the input values (i.e. the configuration parameters) may or may not be associated with a change in the value of the performance indicator. Similarly, there may not be any change in the input values, but the value of the performance indicator may still change.

In this illustrative example, multiple actions are defined. Actions where neither feature is changed are referred to as null actions.

Action A0_1: Feature 1 is unchanged with value 0 and Feature 2 is unchanged with value 3

Action A0_2: Feature 1 is unchanged with value 0 and Feature 2 is unchanged with value 2

Action A0_3: Feature 1 is unchanged with value 1 and Feature 2 is unchanged with value 3

Action A0_4: Feature 1 is unchanged with value 1 and Feature 2 is unchanged with value 2

Some other actions are defined as follows:

Action A1: Feature 1 changed from value 0 to value 1, with Feature 2 unchanged with value 2

Action A2: Feature 1 changed from value 0 to value 1 and Feature 2 changed from value 3 to value 2

Action A3: Feature 1 changed from value 1 to value 0, with Feature 2 unchanged with value 2

Action A4: Feature 1 changed from value 1 to value 0, with Feature 2 unchanged with value 3

Action A5: Feature 2 changed from value 3 to value 2, with Feature 1 unchanged with value 0

Action A6: Feature 2 changed from value 2 to value 3, with Feature 1 unchanged with value 1

Action A8: Feature 1 changed from value 1 to value 0 and Feature 2 is changed from value 2 to value 3

Once the operation data has been obtained, in step 106, a probabilistic graph is constructed. This indicates, for a plurality of the defined states, the probabilities that a specific action will lead to a transition to a respective other state.

Figure 6:
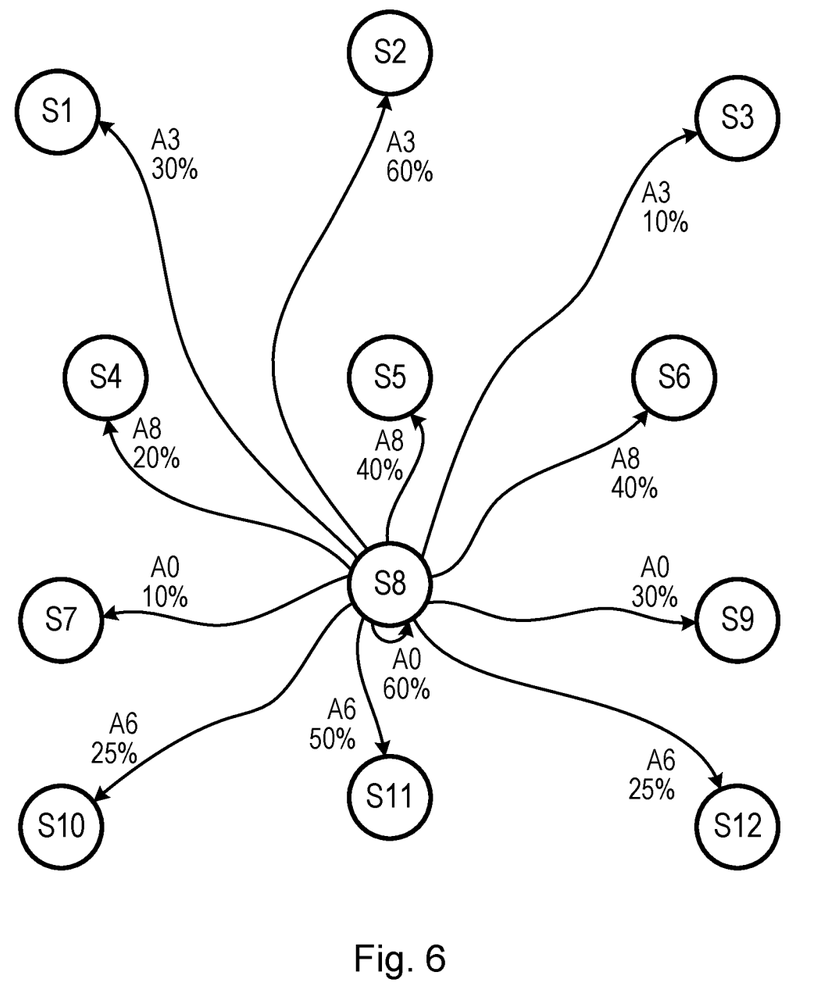
FIG. 6 illustrates a probabilistic graph.

FIG. 6 shows an example of a probabilistic graph. This is based on the states and actions defined above, but takes account of more data than are shown in the table above.

Thus, the probabilistic graph shows, for each state, the probability that performing a specific action will be followed by a transition to a specific other state.

In order to compute the transition probabilities $p_{j,k}^l$ that correspond to an action $A_l$ being followed by a transition from a state $S_k$ to a state $S_j$, we divide the number of transitions $n_{j,k}^l$ from state $S_k$ to state $S_j$ that followed action $A_l$ by the total of number of times that action $A_l$ was performed in the state $S_k$, i.e., $p_{j,k}^l \triangleq n_{j,k}^l / n_k^l$.

Thus, the simplified example illustrated in FIG. 6 shows the actions that may be taken while the system is in state 8 only. In reality, there may be one arrow going from every one of the states to every other one of the states. In effect, the states of the system are vertices, and the actions are edges, in the graph. The graph therefore forms a probabilistic state-action model (SAM), which indicates the transition probabilities between the states when certain actions are performed, where the states capture the performance indicator(s) of interest, namely the VoLTE drop rate in our example.

Thus, in the example illustrated in FIG. 6, when the null action is performed (i.e. there is no change in the input values, or configuration parameters), the resulting state must be state 8 or one of the two other states that have the same configuration parameters and there is a 10% probability that the system will transition to state 7 (i.e. that the performance indicator will fall to a value in the lowest bin), a 60% probability that the state will be unchanged (i.e. that the performance indicator will remain at a value in the middle bin), and a 30% probability that the system will transition to state 9 (i.e. that the performance indicator will rise to a value in the highest bin).

Similarly, when action A3 is performed (i.e. the value of Feature 1 is changed from 1 to 0), the resulting state must be state 1, 2 or 3, i.e. one of the three states that have the relevant configuration parameters, and there is a 30% probability that the system will transition to state 1 (i.e. that the performance indicator will fall to a value in the lowest bin), a 60% probability that the system will transition to state 2 (i.e. that the performance indicator will remain at a value in the middle bin), and a 10% probability that the system will transition to state 3 (i.e. that the performance indicator will rise to a value in the highest bin).

Similarly, when action A6 is performed (i.e. the value of Feature 2 is changed from 2 to 3), the resulting state must be state 10, 11 or 12, i.e. one of the three states that have the relevant configuration parameters, and there is a 25% probability that the system will transition to state 10 (i.e. that the performance indicator will fall to a value in the lowest bin), a 50% probability that the system will transition to state 11 (i.e. that the performance indicator will remain at a value in the middle bin), and a 25% probability that the system will transition to state 12 (i.e. that the performance indicator will rise to a value in the highest bin).

Similarly, when action A8 is performed (i.e. the value of Feature 1 is changed from 1 to 0 and the value of Feature 2 is changed from 2 to 3), the resulting state must be state 4, 5 or 6, i.e. one of the three states that have the relevant configuration parameters, and there is a 20% probability that the system will transition to state 4 (i.e. that the performance indicator will fall to a value in the lowest bin), a 40% probability that the system will transition to state 5 (i.e. that the performance indicator will remain at a value in the middle bin), and a 40% probability that the system will transition to state 6 (i.e. that the performance indicator will rise to a value in the highest bin).

The reason that the graph is probabilistic is due to the fact that some network aspects, e.g., traffic, are stochastic by nature. Hence, for the same input configuration, we may end up with different KPI values. For example, in the table of values given above, there are different KPI values on 18/10/24 and 18/10/25, even though the configuration is the same on those days, and similarly on 18/10/28 and 18/10/31. The use of a probabilistic SAM can capture these random aspects of the network.

Further, having created the probabilistic graph, it can be updated based on new operational data, as new data records are received. Specifically, the updating can take the form of updating the transition probabilities among the states. This efficiently allows new information to be incorporated in the model without losing past information, without requiring individual data records to be kept indefinitely, which is impractical due to storage and cost constraints. Thus, the modelling method acts as memory of the system, and as a smart way to encode and compress past data.

In the architecture shown in FIG. 4, steps 102, 104, and 106 of the method may be performed in the network node or element 92.

Returning to FIG. 5, in step 108 the system identifies a current state of the system and at least one desired state. For example, the at least one desired state may comprise a state in which the performance indicator value has a desirable value or a more desirable value.

By way of illustration, in the example given above, where there are four possible combinations of values of the configuration parameters, and three possible values for the performance indicators, there are four states where the performance indicator value is in the lowest of the three bins, and any or all of those states may be identified as a desired state.

Then, in step 110, the system determines at least one action to cause the transition from the current state to a desired state.

Thus, once we have the graph representation in place, then we find a path between the current and the desired state, if such a path exists in the graph. In other words, we can infer which course of action has the highest probability of leading to the intended results. One implementation of this step is a greedy search, taking the path from the current state vertex, with the action that most improves the performance indicator value.

In one embodiment, this corresponds to taking the action that has the largest impact in the 1st-order neighbourhood of the state.

More generally, the system may determine a shortest path, corresponding to the least number of actions needed to reach the desired final state, or may determine a maximum probability path, namely the path whose actions have the largest compound probability (i.e. the product of probabilities for each individual transition) of resulting in the desired final state.

Thus, in the example shown in FIG. 6, action A3 has the highest probability of transitioning to a state in which the performance indicator value is in the most desirable bin, and so this action can be determined as being the action to cause the transition from the current state to a desired state. In this example, any of the four states where the performance indicator value is in the lowest of the three bins is considered as an equally desirable state. In other examples, only one state may be identified as a desirable state.

Although FIG. 6 shows a relatively straightforward example, in more complex examples multi-stage transitions may be needed to move towards a desired state. As an example, multi-stage transitions can be implemented following the aforementioned principles of using the shortest path or the maximum probability path. However, more complicated graph search methods can be implemented when there are constraints in place, for example when each feature is changed at most n times, where n may equal 1, 2, or any other positive integer.

Thus, by exploring different paths towards the desired state, we can infer which are the most influential actions and the corresponding features. Therefore, the probabilistic graph representation can be used to infer not only the relevant features to look into, but also the changes in those features. This inference would not be possible by simply observing the past records, since in practice there would be such a large number of such records. Moreover, since the actions that are proposed are based on past observations, it can be guaranteed that the actions are allowed in the network.

In the architecture shown in FIG. 4, steps 108 and 110 of the method may be performed in the A1 node or element 94.

Returning again to FIG. 5, in step 112 any change in a configuration parameter corresponding to the at least one determined action is applied to the cell, or the network node.

In the architecture shown in FIG. 4, step 112 of the method may be performed in the actuation node or element 96.

Thus, advantageously, historical records are used to identify influential cell configuration features and actions that can be utilized to reconfigure the cells in order to improve the UE experience as defined by the chosen set of KPIs. Although the real historical data are used, the required changes could not be inferred by merely examining the historical data. Rather, the model infers the influential changes from the historical records and data by creating a graph for cell configuration and actions. Advantageously, this allows the historical data to be used, without requiring individual data records to be stored permanently.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of configuration in a communications network, the method comprising:
   obtaining operational data relating to operation of at least one network node, the operational data comprising, for each of a plurality of time periods, data relating to at least one configuration parameter of the network node and data relating to performance indicators of the network node, wherein the data relating to the performance indicators of the network node is obtained by joint data binning of performance indicator values of the performance indicators, wherein the joint data binning includes clustering the performance indicator values to generate a finite set of bins;
   defining a plurality of actions, wherein each action corresponds to a specific set of values of the at least one configuration parameter in two successive time periods;
   defining a plurality of states based on the Cartesian product of a set of possible values for each of the at least one configuration parameter and the finite set of bins, wherein each state corresponds to one specific set of values of the operational data, the specific set of values comprising a value from each of the at least one configuration parameter and a bin from the finite set of bins; and
   constructing a probabilistic graph from said operational data, the probabilistic graph indicating, for a plurality of the defined states, a probability that an action will lead to a transition to a respective other state.

2. The method according to claim 1, wherein the operational data relate to operation of a cell of a cellular communications network, such that the data relating to the at least one configuration parameter comprise data relating to at least one configuration parameter of the cell, and the data relating to the performance indicators comprise data relating to at least one performance indicator of the cell.

3. The method according to claim 1, wherein the performance indicators comprises one performance indicator selected from:
   a drop rate of voice calls;
   a latency of a streaming media connection; and
   a jitter of a streaming media connection.

4. The method according to claim 1, wherein the operational data relate to operation of a core network node of a cellular communications network, such that the data relating to the at least one configuration parameter comprise data relating to at least one configuration parameter of the core network node, and the data relating to the performance indicators comprise data relating to at least one performance indicator of the core network node.

5. The method according to claim 4, wherein the performance indicators comprises one performance indicator selected from:
   a service request success rate; and
   a handover success rate.

6. The method according to claim 1, wherein the probability that an action will lead to a transition to a respective other state comprises a ratio of a number of times that performing said action in a first state has led to a transition to said other state to a total number of times that said action has been performed in said first state.

7. The method according to claim 1, further comprising:
   identifying a current state and at least one desired state; and
   determining at least one action to cause the transition from the current state to a desired state.

8. The method according to claim 7, comprising:
   determining said at least one action to cause a shortest path transition from the current state to the desired state.

9. The method according to claim 7, comprising:
   determining said at least one action to cause a maximum probability transition from the current state to the desired state.

10. The method according to claim 7, further comprising:
    applying any change in a configuration parameter corresponding to the at least one determined action.

11. The method according to claim 1, further comprising:
    updating the probabilistic graph based on new operational data.

12. A method of configuration in a communications network, the method comprising:
    receiving information defining a probabilistic graph including operational data, wherein the probabilistic graph indicates, for a plurality of defined states, a probability that an action will lead to a transition to a respective other state,
    wherein the operational data relate to operation of at least one network node, and comprise, for each of a plurality of time periods, data relating to at least one configuration parameter of the network node and data relating to performance indicators of the network node, wherein the data relating to the performance indicators of the network node is obtained by joint data binning of performance indicator values of the performance indicators, wherein the joint data binning includes clustering the performance indicator values to generate a finite set of bins, wherein the plurality of defined states is based on the Cartesian product of a set of possible values for each of the at least one configuration parameter and the finite set of bins, wherein each defined state corresponds to one specific set of values of the operational data, the specific set of values comprising a value from each of the at least one configuration parameter and a bin from the finite set of bins, and wherein each of a plurality of defined actions corresponds to a specific set of values of the at least one configuration parameter in two successive time periods;

identifying a current state and at least one desired state; and determining at least one action to cause the transition from the current state to a desired state.

13. The method according to claim 12, further comprising:

causing any change in a configuration parameter corresponding to the at least one determined action to be applied in a network node.

14. The method according to claim 12, wherein the operational data relate to operation of a cell of a cellular communications network, such that the data relating to the at least one configuration parameter comprise data relating to at least one configuration parameter of the cell, and the data relating to the performance indicators comprise data relating to at least one performance indicator of the cell.

15. A node for configuration of a communications network, the node comprising processing circuitry and a memory containing instructions executable by the processing circuitry, whereby the node is operable to:

obtain operational data relating to operation of at least one network node, the operational data comprising, for each of a plurality of time periods, data relating to at least one configuration parameter of the network node and data relating to performance indicators of the network node, wherein the data relating to the performance indicators of the network node is obtained by joint data binning of performance indicator values of the performance indicators, wherein the joint data binning includes clustering the performance indicator values to generate a finite set of bins;

define a plurality of actions, wherein each action corresponds to a specific set of values of the at least one configuration parameter in two successive time periods;

define a plurality of states based on the Cartesian product of a set of possible values for each of the at least one configuration parameter and the finite set of bins, wherein each state corresponds to one specific set of values of the operational data; and construct a probabilistic graph from said operational data, the probabilistic graph indicating, for a plurality of the defined states, a probability that an action will lead to a transition to a respective other state.

16. A node for configuration of a communications network, the node comprising processing circuitry and a memory containing instructions executable by the processing circuitry, whereby the node is operable to:

receive information defining a probabilistic graph including operational data, wherein the probabilistic graph indicates, for a plurality of defined states, a probability that an action will lead to a transition to a respective other state, wherein the operational data relate to operation of at least one network node, and comprise, for each of a plurality of time periods, data relating to at least one configuration parameter of the network node and data relating to performance indicators of the network node, wherein the data relating to the performance indicators of the network node is obtained by joint data binning of performance indicator values of the performance indicators, wherein the joint data binning includes clustering the performance indicator values to generate a finite set of bins, wherein the plurality of defined states is based on the Cartesian product of a set of possible values for each of the at least one configuration parameter and the finite set of bins, wherein each defined state corresponds to one specific set of values of the operational data, the specific set of values comprising a value from each of the at least one configuration parameter and a bin from the finite set of bins, and wherein each of a plurality of defined actions corresponds to a specific set of values of the at least one configuration parameter in two successive time periods;

identify a current state and at least one desired state; and determine at least one action to cause the transition from the current state to a desired state.

* * * * *